US011567333B2

(12) United States Patent
Watanabe et al.

(10) Patent No.: US 11,567,333 B2
(45) Date of Patent: Jan. 31, 2023

(54) HEAD-MOUNTED DISPLAY, HEAD-MOUNTED DISPLAY LINKING SYSTEM, AND METHOD FOR SAME

(71) Applicant: MAXELL, LTD., Kyoto (JP)

(72) Inventors: Mitsunobu Watanabe, Kyoto (JP); Yasunobu Hashimoto, Kyoto (JP); Osamu Kawamae, Kyoto (JP); Nobuo Masuoka, Kyoto (JP); Kazuhiko Yoshizawa, Kyoto (JP); Hiroshi Shimizu, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 17/829,557

(22) Filed: Jun. 1, 2022

(65) Prior Publication Data

US 2022/0291512 A1    Sep. 15, 2022

Related U.S. Application Data

(63) Continuation of application No. 16/972,743, filed as application No. PCT/JP2018/024066 on Jun. 25, 2018, now Pat. No. 11,378,805.

(51) Int. Cl.
*G02B 27/01*     (2006.01)
(52) U.S. Cl.
CPC .. *G02B 27/0172* (2013.01); *G02B 2027/0163* (2013.01); *G02B 2027/0178* (2013.01)
(58) Field of Classification Search
CPC ........ G02B 27/0172; G02B 2027/0163; G02B 2027/0178
See application file for complete search history.

(56) References Cited

U.S. PATENT DOCUMENTS

| 8,427,396 B1 | 4/2013 | Kim |
| 8,823,740 B1 | 9/2014 | Amirparviz |
| 9,310,612 B2 | 4/2016 | Cho |
| | (Continued) | |

FOREIGN PATENT DOCUMENTS

| JP | 2011-186856 A | 9/2011 |
| JP | 2015-222891 A | 12/2015 |
| | (Continued) | |

OTHER PUBLICATIONS

International Search Report of PCT/JP2018/024066 dated Sep. 18, 2018.

*Primary Examiner* — Ricardo Osorio
(74) *Attorney, Agent, or Firm* — Mattingly & Malur, PC

(57) ABSTRACT

A head-mounted display comprises: a wearing body; a display; a communication module configured to perform communication connection with a mobile information terminal; a field of view (FOV) sensor configured to output status data used for determining whether the mobile information terminal is included in a user's FOV through the wearing body; and a controller connected to each of the display, the communication module, and the FOV detection sensor. The controller determines whether the mobile information terminal is included in the user's FOV based on the status data, and performs display control with respect to the display so as to display an application screen of the mobile information terminal on the display when determining that the mobile information terminal is not included in the FOV, and not to display the application screen on the display when determining that the mobile information terminal is included in the FOV.

8 Claims, 13 Drawing Sheets

(56) References Cited

U.S. PATENT DOCUMENTS

| | | |
|---|---|---|
| 9,344,612 B2 | 5/2016 | Ritchey |
| 2012/0127284 A1 | 5/2012 | Bar-Zeev |
| 2012/0218171 A1 | 8/2012 | Fujigaki |
| 2012/0242560 A1 | 9/2012 | Nakada |
| 2013/0006529 A1 | 1/2013 | Miyamoto |
| 2015/0062159 A1 | 3/2015 | Hildreth |
| 2016/0320836 A1 | 11/2016 | Oyama |
| 2016/0378176 A1 | 12/2016 | Shiu |
| 2017/0060266 A1 | 3/2017 | Gao et al. |
| 2018/0164589 A1 | 6/2018 | Watanabe et al. |
| 2018/0366089 A1 | 12/2018 | Sekiguchi et al. |
| 2019/0043263 A1 | 2/2019 | Nakashima |
| 2019/0079590 A1 | 3/2019 | Tomizawa |

FOREIGN PATENT DOCUMENTS

| | | |
|---|---|---|
| JP | 2017-174018 A | 9/2017 |
| JP | 2017-533480 A | 11/2017 |
| WO | 2016/006070 A1 | 1/2016 |
| WO | 2016/194844 A1 | 12/2016 |
| WO | 2017/104089 A1 | 6/2017 |

HEAD-MOUNTED DISPLAY, HEAD-MOUNTED DISPLAY LINKING SYSTEM, AND METHOD FOR SAME

TECHNICAL FIELD

The present invention relates to a display technique of a head-mounted display (hereinafter abbreviated as "HMD").

BACKGROUND ART

As background art to which the present invention belongs, Patent Literature 1 discloses a system which is configured to "calculate positional information of head-mounted display wearer's gaze with respect to primary information based on a camera image acquired from the head-mounted display and a position of the head-mounted display wearer's gaze with respect to the camera image, select and display secondary information associated with the calculated positional information, and change how the secondary information is displayed depending on whether the wearer is looking at the primary information" (excerpted from Abstract).

Patent Literature 2 discloses "a head-mounted display device which allows a user to view a virtual image and an outside scene, comprising: a generation unit configured to generate an image list including a first image which is a display image of an external device connected to the head-mounted display device and a second image which is possessed by the head-mounted display device; and an image display unit configured to form a virtual image representing the generated image list" (excerpted from Abstract).

CITATION LIST

Patent Literature

Patent Literature 1: WO-A-2017/104089
Patent Literature 2: JP-A-2015-222891

SUMMARY OF INVENTION

Technical Problem

The systems disclosed in Patent Literature 1 and Patent Literature 2 are configured to allow a display image to be shared with the HMD when the HMD and the external display device are connected to communicate to each other. Accordingly, when the prior art above is applied to a mobile information terminal and the HMD which have a communication function, the display image of the mobile information terminal is displayed on the HMD upon link establishment between the HMD and the mobile information terminal. With this configuration, even in a case where displaying of an image is not expected nor demanded by a user, a screen of the mobile information terminal may be displayed, resulting in inconvenience in use.

The present invention has been made in view of the circumstances above, and an object of the present invention is to provide a linkage technique between an HMD and a mobile information terminal, which is configured to display a screen of the mobile information terminal on the HMD at a timing useful for a user, thereby realizing good operability.

Solution to Problem

In order to solve the problems above, the present invention includes the technical features described in the scope of claims. As an example thereof, the present invention provides a head-mounted display comprising: a wearing body to be worn on a head of a user; a display provided on the wearing body in front of the user's eyes; a communication module configured to perform communication connection with a mobile information terminal; a field of view detection sensor configured to output status data used for determining whether the mobile information terminal is included in a field of view of the user through the wearing body; and a controller connected to each of the display, the communication module, and the field of view detection sensor, wherein the controller is configured to: determine whether the mobile information terminal is included in the field of view of the user based on the status data; and perform display control with respect to the display so as to display an application screen, which displays an execution state of application program for realizing a specific function executed by the mobile information terminal, on the display when determining that the mobile information terminal is not included in the field of view, and not to display the application screen on the display when determining that the mobile information terminal is included in the field of view.

Advantageous Effects of Invention

According to the present invention, it is possible to provide a linkage technique between an HMD and a mobile information terminal, which is configured to display a screen of the mobile information terminal on the HMD at a timing useful for a user, thereby realizing good operability. The problems, configurations, and effects other than those described above will be clarified by explanation of the embodiments below.

DESCRIPTION OF EMBODIMENTS

Hereinafter, embodiments of the present invention will be described with reference to the drawings. Throughout the drawings, the same components are provided with the same reference signs and repetitive explanation thereof will be omitted.

First Embodiment

The first embodiment is an embodiment in which when an HMD and a smartphone as a mobile information terminal is connected to communicate to each other and when the mobile information terminal is not in a field of view of a user wearing the HMD, an application screen of the mobile information terminal is displayed on the HMD. The term "application screen" mentioned herein means a screen on which an execution status of an application program executed on the mobile information terminal is displayed.

Figure 1:
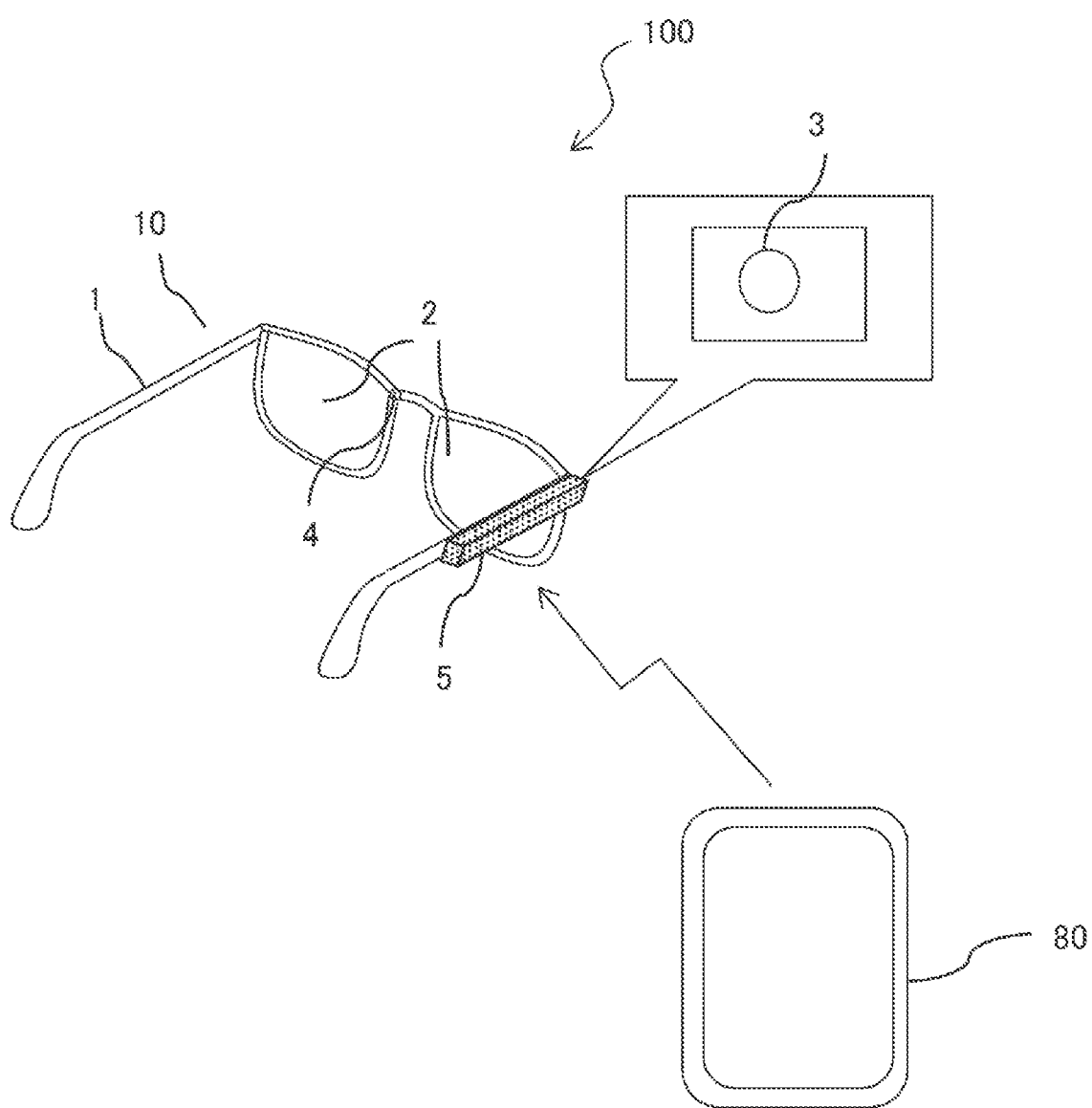
FIG. 1 is a schematic diagram of an HMD linking system.

FIG. 1 is a schematic diagram of an HMD linking system 100. The HMD linking system 100 is configured by an HMD 10 and a mobile information terminal 80 which are wirelessly connected to perform communication therebetween. FIG. 1 illustrates a smart phone as the mobile information terminal 80, meanwhile, any types of the mobile information terminal 80 may be used as long as it is a mobile image display device such as a tablet terminal or a smart watch.

The HMD 10 mainly includes a wearing body 1, a display 2, an outside camera 3, an inside camera 4, and an HMD controller 5.

The wearing body 1 is a member that maintains a state where the HMD 10 is mounted on the head of a user M of the HMD 10 (see FIG. 8 and FIG. 10) and holds other components of the HMD 10. FIG. 1 illustrates the wearing body 1 in the shape of glasses, meanwhile, the shape is not limited thereto.

The display 2 is a transmissive liquid crystal display and is arranged on the wearing body 1 in front of the eye of the user M.

The outside camera 3 is a camera equipped with a CCD or a CMOS, which is, when it is defined that a side of the wearing body 1 facing the face of the user M is an inside while a side opposite to the inside is an outside, provided on a front outside of the wearing body 1. The outside camera 3 is provided on the wearing body 1 at a position and orientation including a field of view of the user M within an angle of view.

The inside camera 4 is a camera equipped with a CCD or a CMOS, which is provided on the inside of the wearing body 1 at a position and orientation on which movement of the eye of the user M can be imaged.

The HMD controller 5 is configured by using a processor or a circuit for performing communication control of the mobile information terminal 80 and display control of the display 2. In the present embodiment, an example in which a general purpose computer is used to execute software for realizing functions of an HMD linking method according to the present embodiment will be described.

Figure 2:
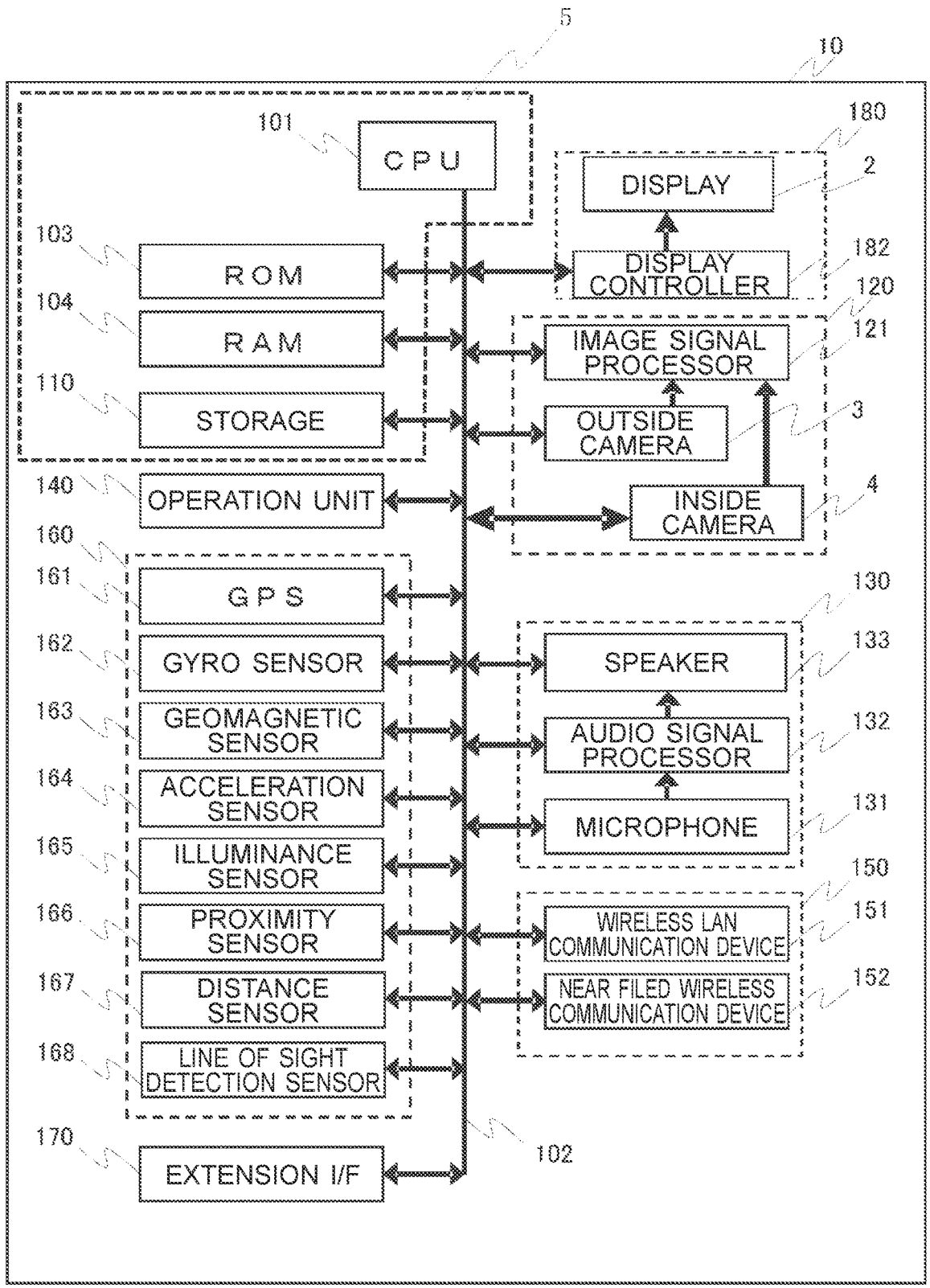
FIG. 2 is a hardware block diagram of an HMD.

FIG. 2 is a hardware block diagram of the HMD 10.

As illustrated in FIG. 2, the HMD 10 includes the HMD controller 5, an imaging unit 120, an audio unit 130, an operation unit 140, a communication module 150, a sensor unit 160, an extension I/F 170, and a display unit 180 which are connected to each other by a system bus 102.

The HMD controller 5 includes a CPU (Central Processor) 101, a ROM (Read Only Memory) 103, a RAM (Random Access Memory) 104, an HDD (Hard Disk Drive), and a storage 110 which comprises an SSD (Solid State Drive) having a semiconductor memory such as a flash memory.

The imaging unit 120 includes the outside camera 3, the inside camera 4, and an image signal processor 121 configured to convert output signals of each camera into image signals.

The audio unit 130 includes a microphone 131 configured to input sound, an audio signal processor 132 including noise processing and amplification processing of an audio signal from the microphone 131, and a speaker 133 configured to reproduce a ring tone and sound.

The operation unit 140 includes an operation button and an operation switch, which are configured by an operation member such as an ON/OFF button of a main power supply of the HMD 10 or a volume dial thereof. Each operation member has a function as an operation detection sensor since they are members for detecting that an input operation has been made by accepting an operation of the user.

The communication module 150 includes a wireless LAN communication device (transmitter and receiver) 151 for connecting the HMD 10 to a wireless LAM such as Wi-Fi (registered trademark), Infrared communication, or the like, and a near filed wireless device (transmitter and receiver) 152 using Bluetooth (registered trademark) or the like.

The sensor unit 160 includes a GPS (Global Positioning System) 161, a gyro sensor 162 configured to detect changes in rotation and direction, a geomagnetic sensor 163 configured to measure orientation, an acceleration sensor 164 configured to detect data relating to inclination, movement, vibration, and impact, an illuminance sensor 165 configured to detect brightness of the surrounding of the HMD 10, a proximity sensor 166, a distance sensor 167, and a line of sight detection sensor 168. The gyro sensor 162, the acceleration sensor 164, the line of sight detection sensor 168 are used as a field of view detection sensor for detecting a field of view of the user M in each embodiment.

The display unit 180 includes the display 2 and a display controller 182 configured to perform generation and output control of data to be displayed on the display 2.

Figure 3:
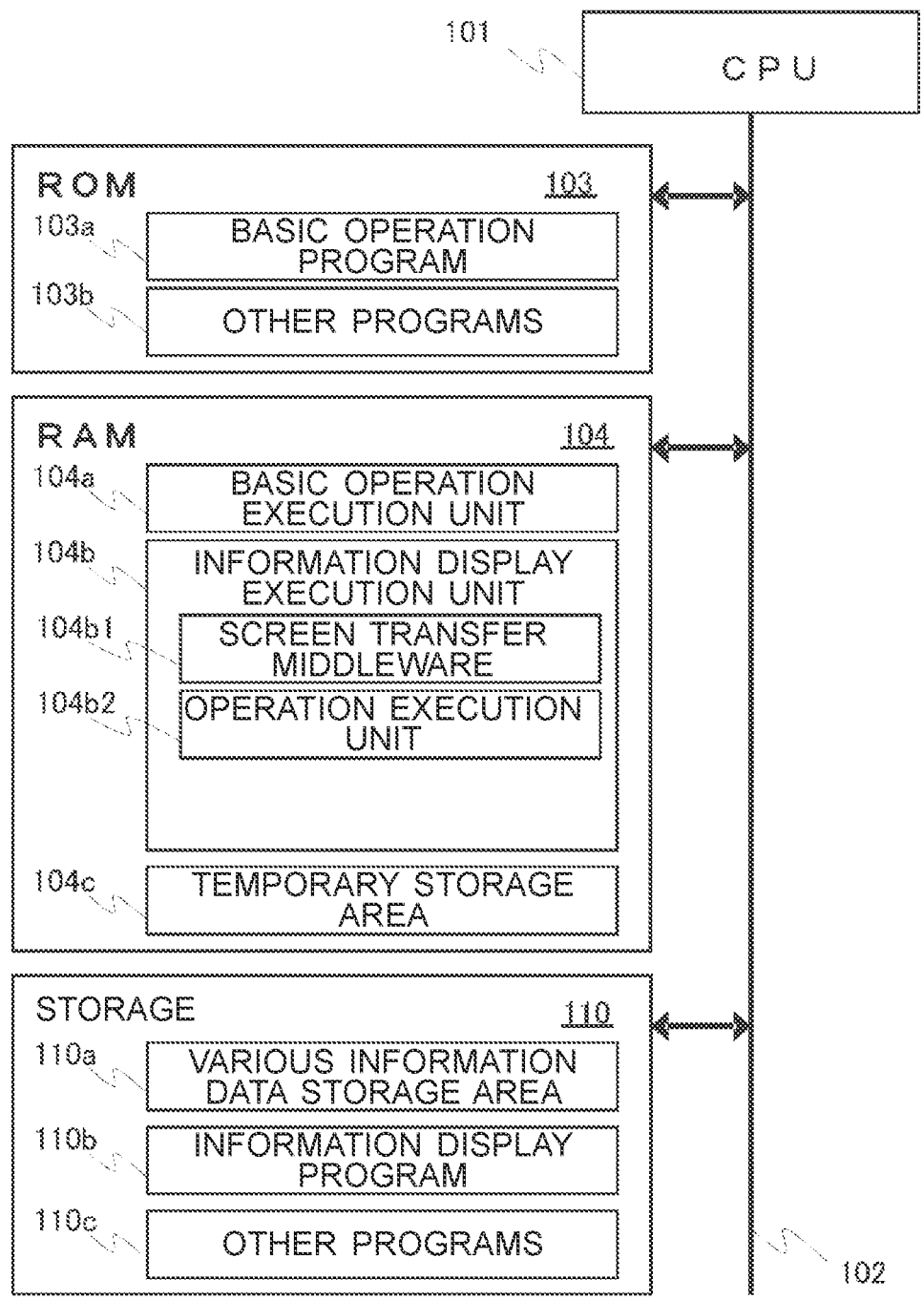
FIG. 3 is a software block diagram of an HMD.

FIG. 3 is a software block diagram of the HMD 10.

The ROM 103 includes a basic operation program 103a and other programs 103b of the HMD 10. The basic operation program 103a includes an activation program of the HMD 10, a display control program of a top screen (see a top screen 1501 of FIG. 15) to be displayed during normal activation processing, and a program for communicating with the mobile information terminal 80.

The RAM 104 is an area where the CPU 101 loads the programs stored in the ROM 103 or the storage 110 during execution thereof. During execution of each program, a basic operation execution unit 104a, an information display execution unit 104b, and a temporary storage area 104c are generated in the RAM 104. The information display execution unit 104b includes a screen transfer middleware 104b1 configured to display or not display an application screen of the mobile information terminal 80 on the HMD 10, and an operation execution unit 104b2.

The screen transfer middleware 104b1 is a program for performing display and control of the application screen on the display 2 of the HMD 10. In the present embodiment, the screen transfer middleware 104b1 is configured as middleware, meanwhile, the function thereof may be realized by a daemon or a driver which is operated on the OS. Furthermore, instead of the screen transfer middleware 104b1, an application that individually corresponds to each application of the mobile information terminal 80 and is operated on the HMD 10 may be employed.

The storage 110 stores a various information data storage area 110a, an information display program 110b, and other programs 110c. A screen movement flag (see FIG. 7), which will be described later, may be provided in the various information data storage area 110a or in the temporary storage area 104c of the RAM 104. In addition, small region management data for dividing the display 2 into a plurality of small regions and managing them, which will be described later, is also stored in the various information data storage areas 2.

Figure 4:
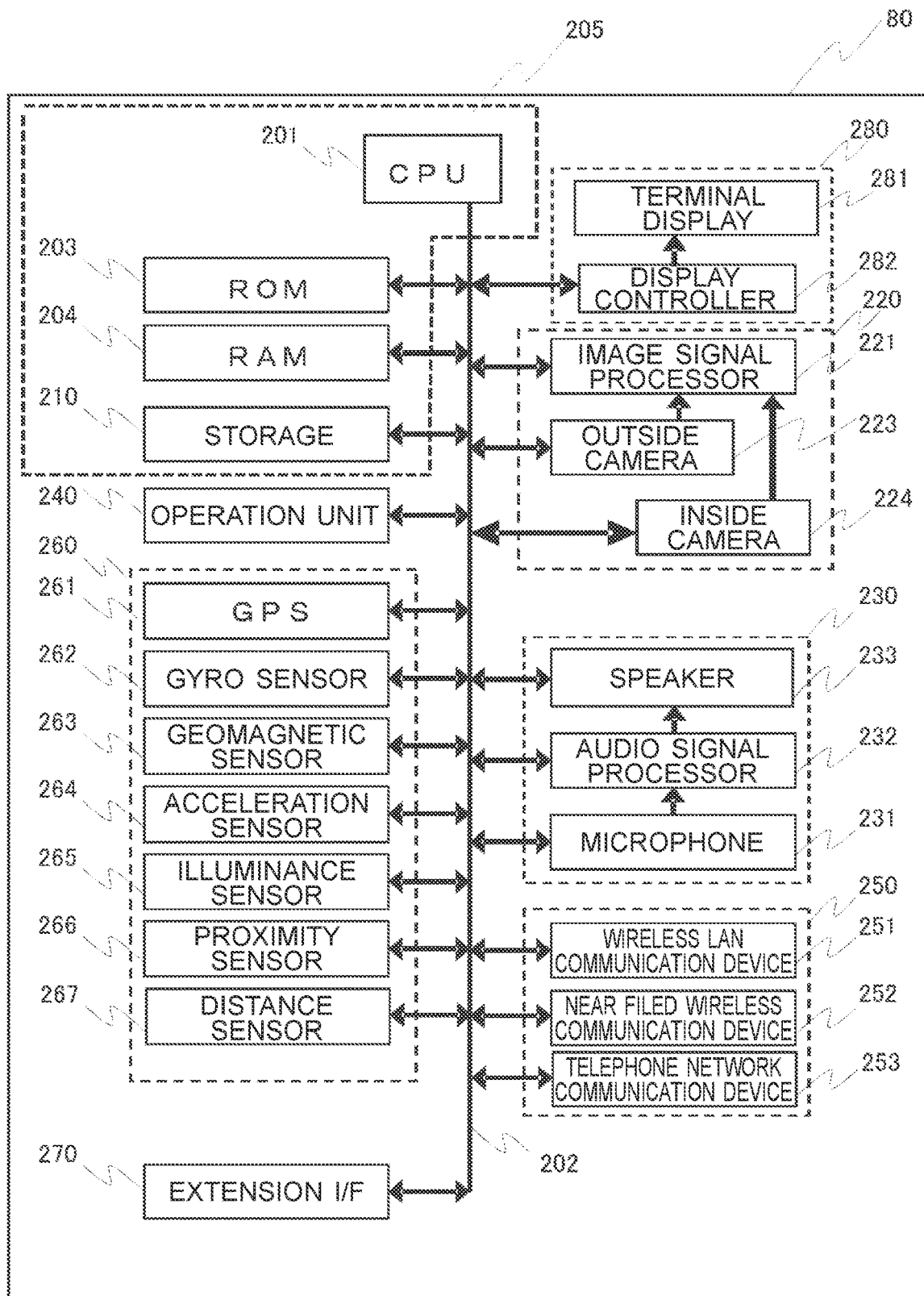
FIG. 4 is a hardware block diagram of a mobile information terminal.

FIG. 4 is a hardware block diagram of the mobile information terminal 80. The components common to the hardware configuration of the HMD 10 are provided with the same names as those of the HMD 10, and illustrated with reference signs 201 to 282. The hardware configuration of the mobile information terminal 80 differs from the hardware configuration of the HMD 10 in that the line of sight detection sensor 168 provided in the HMD 10 is not provided, and that a terminal communication module 250 includes a telephone network communication device (transmitter and receiver) 253 for connecting the mobile information terminal 80 to 3G or 4G network. Here, an inside camera 224 of the mobile information terminal 80 is a camera which is provided on a surface of the mobile information terminal 80 on which a terminal display 281 is provided (front surface), which allows to perform so-called self-photographing. An outside camera 223 is a camera which is provided on a back surface.

Figure 5:
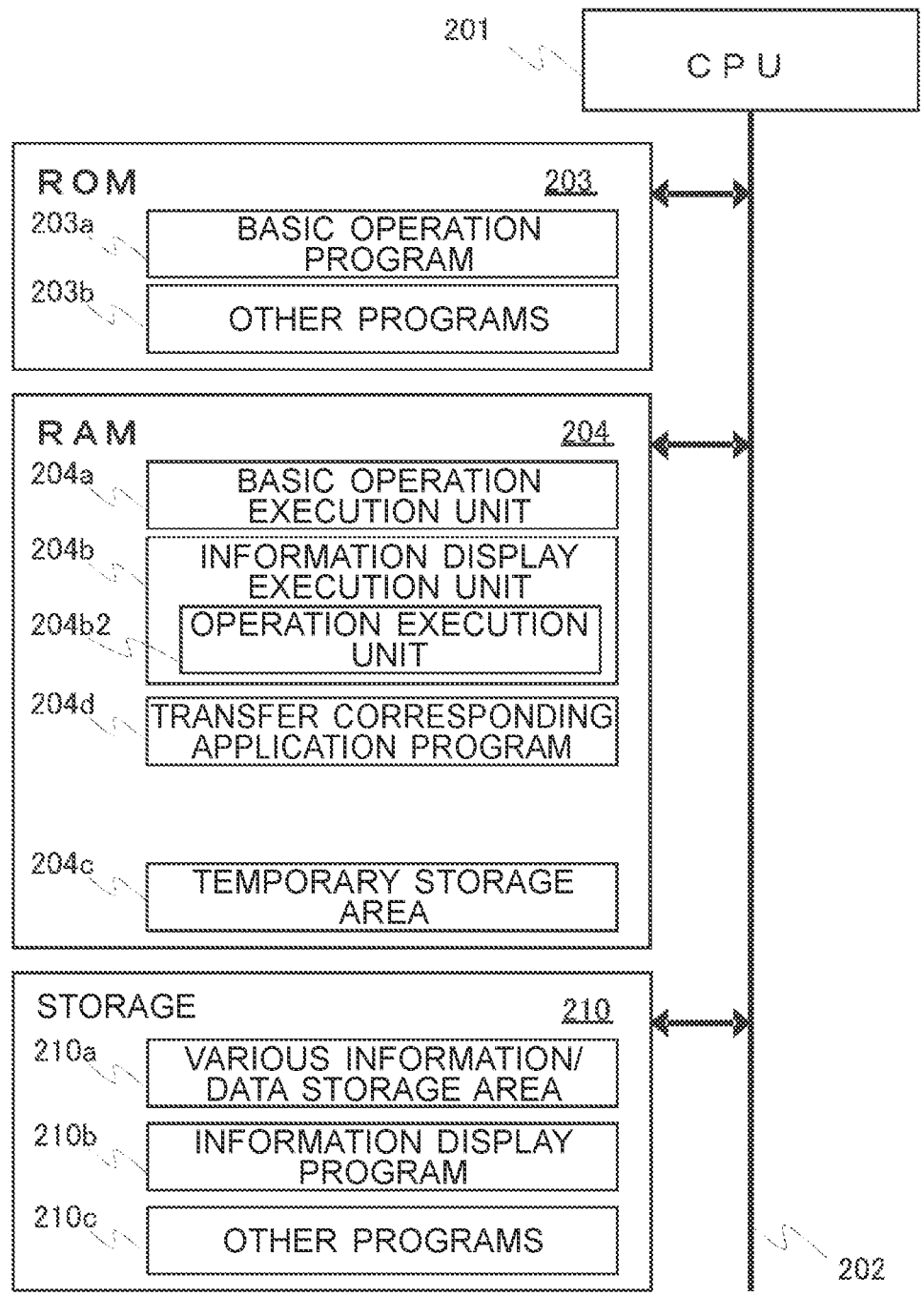
FIG. 5 is a software block diagram of a mobile information terminal.

FIG. 5 is a software block diagram of the mobile information terminal 80. The components common to the software configuration of the HMD 10 are provided with the same names as those of the HMD 10, and illustrated with reference signs 201 to 210c. The software configuration of the mobile information terminal 80 differs from the software configuration of the HMD 10 in that the screen transfer middleware 104b1 is not provided, and that a transfer corresponding application program 204d for linking the mobile information terminal 80 with the HMD 10 to display an application screen on the HMD 10, is provided. The transfer corresponding application program 204d is one of the application program installed respectively in the mobile information terminal 80, which has a function of displaying an application screen on the HMD 10. The function of the transfer corresponding application program, such as a map navigation application program, an electronic book application program, etc., is not limited. In the present embodiment, an example in which the transfer corresponding application program 204d is used will be described. Meanwhile, it may be configured to execute a screen transfer middleware on the mobile information terminal 80 to display a screen, which is displayed on the terminal display 281 of the mobile information terminal 80, on the HMD 10, without making each application correspond to screen transfer.

In addition, the transfer corresponding application program 204d may be configured to display the screen in high resolution or low resolution in accordance with display capability of the mobile information terminal 80 and the HMD 10 and/or using scenes thereof, and moreover, may be configured to perform detailed display or simplified display.

The HMD 10 and the mobile information terminal 80 may be connected by near field wireless communication or a wireless LAN. They may also communicate by Peer-to-Peer and one-to-one, or via a cloud.

As a mode of transferring the application screen from the mobile information terminal 80 to the HMD 10, the application screen displayed on the terminal display 281 of the mobile information terminal 80 may be captured and then transferred. In such a case, a still image is transferred. Upon capturing a screen, the screen may be updated periodically.

In addition, both the mobile information terminal 80 and the HMD 10 may store the transfer corresponding application program 204d, respectively, so that the transfer corresponding application program 204d stored in the HMD 10 and the transfer corresponding application program 204d stored in the mobile information terminal 80 are synchronized to display the screen having the same content as the screen of the terminal display 281 on the display 2 of the HMD 10, instead of transferring screen data by linking the operations of each of the transfer corresponding application program 204d. Furthermore, a motion image may be transferred from the transfer corresponding application program 204d to the HMD 10 by means of streaming or the like.

Figure 6:
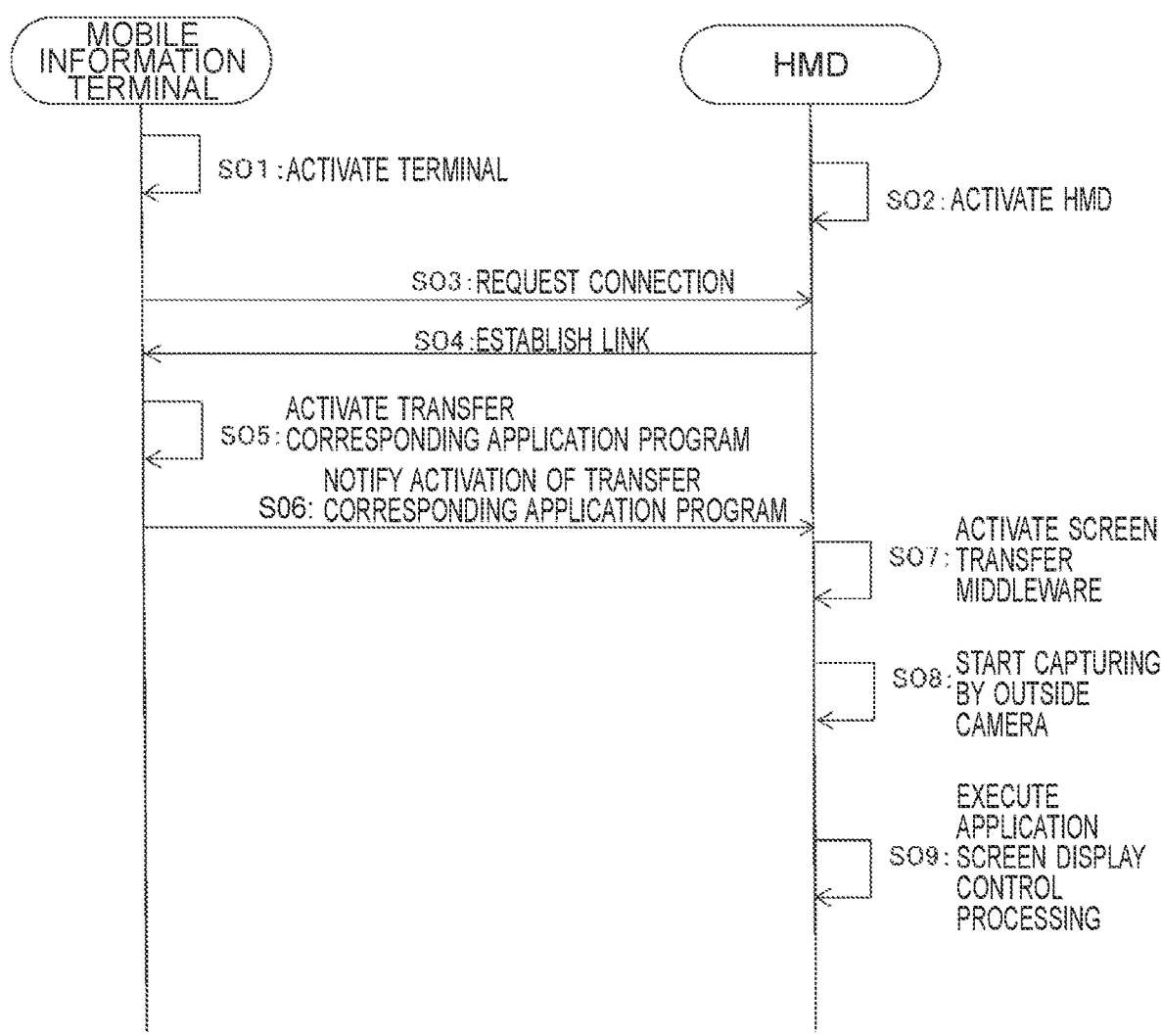
FIG. 6 illustrates an example of a sequence of an HMD linking system according to a first embodiment.
Figure 7:
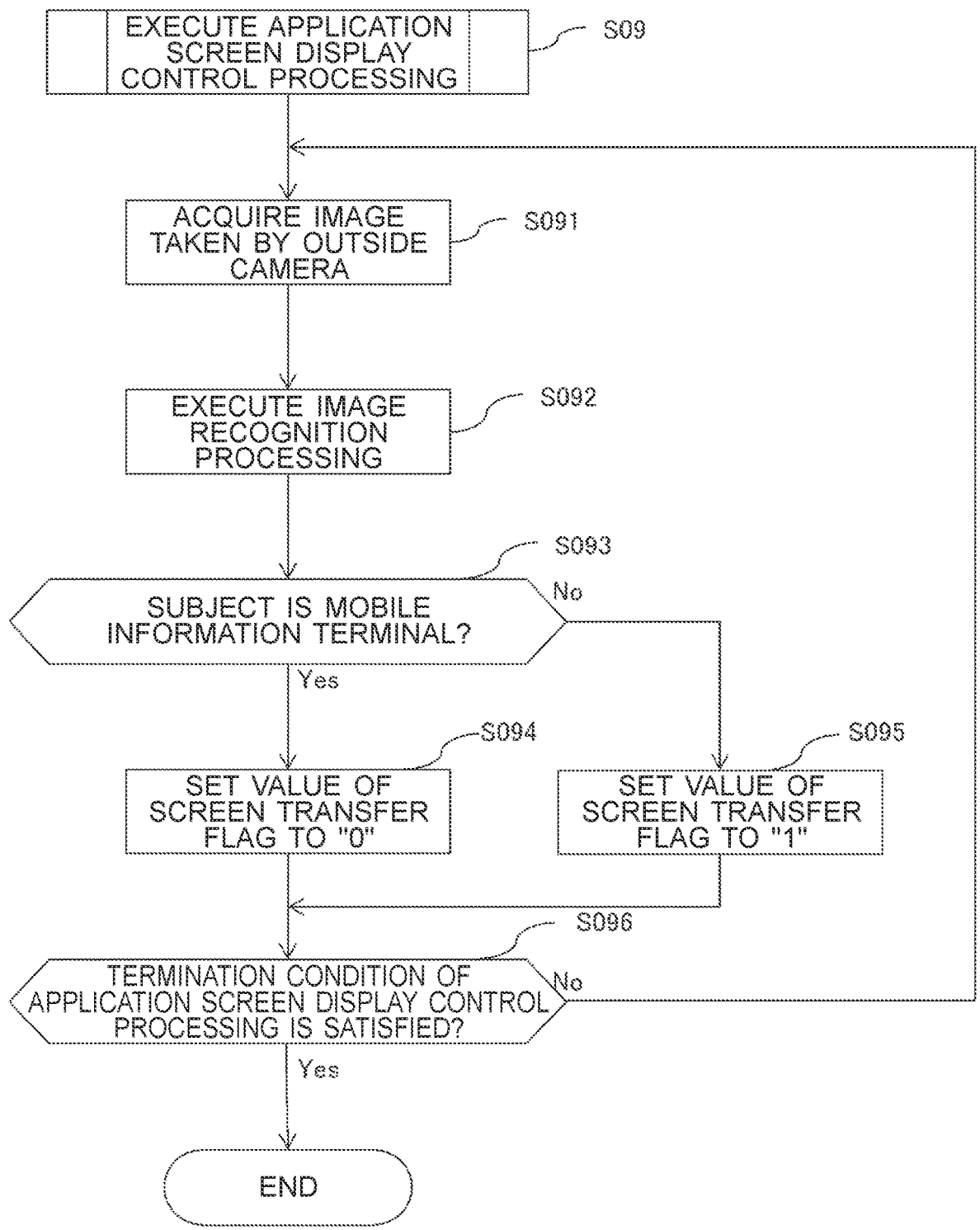
FIG. 7 illustrates a flowchart showing a flow of application screen display control processing according to the first embodiment.
Figure 8:
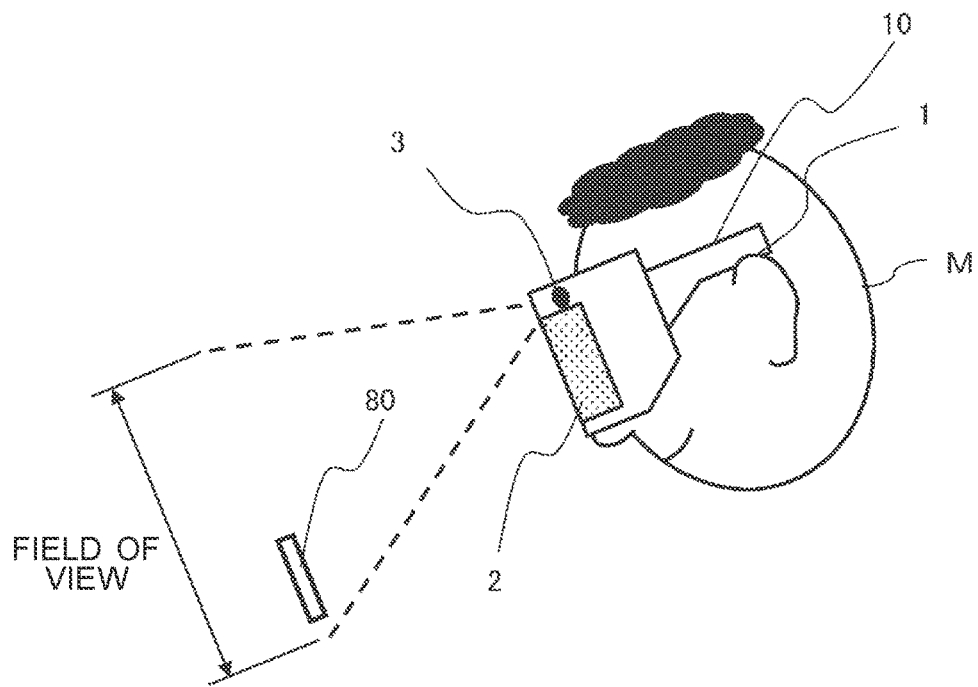
FIG. 8 illustrates a positional relationship between a field of view and a mobile information terminal (application screen is not displayed).
Figure 9:
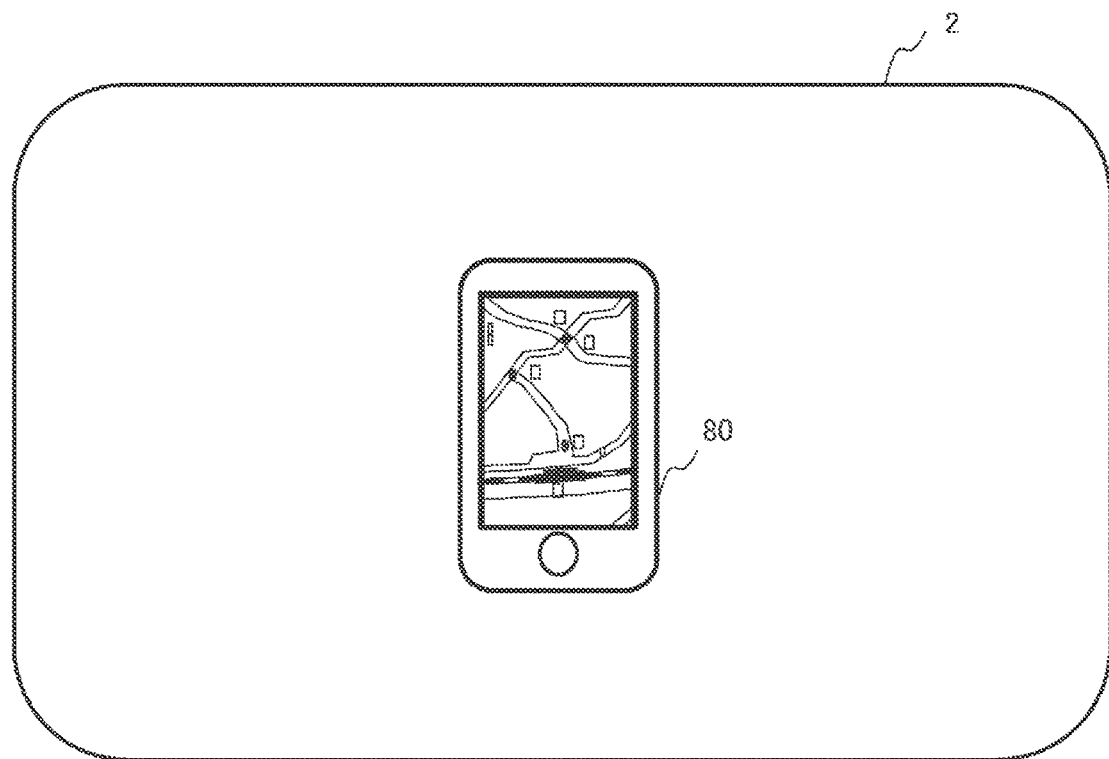
FIG. 9 illustrates a scene which is obtained through a display when an application screen is not displayed.
Figure 10:
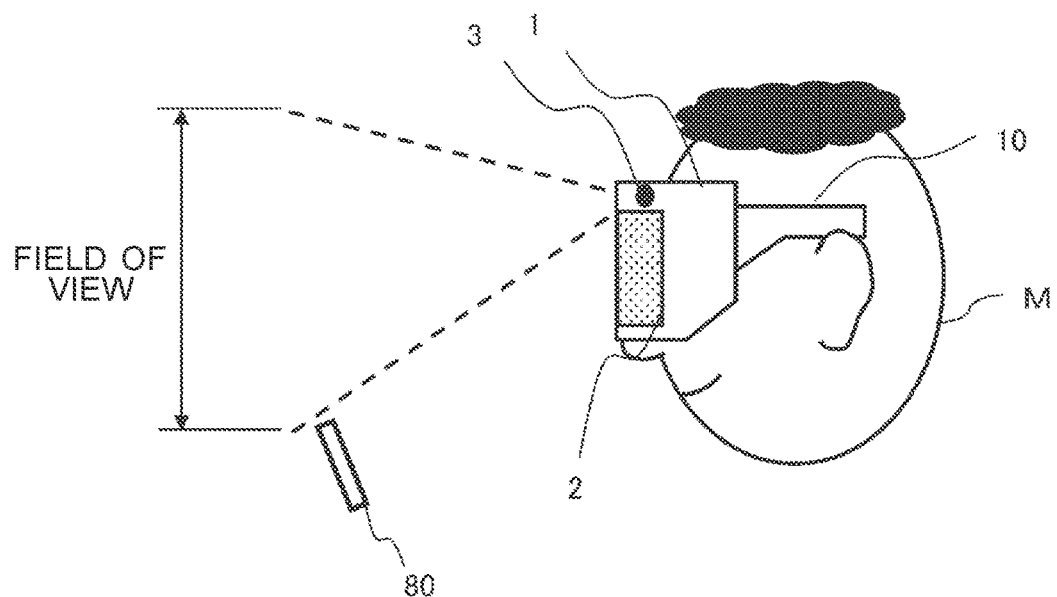
FIG. 10 illustrates a positional relationship between a field of view and a mobile information terminal (application screen is displayed).
Figure 11:
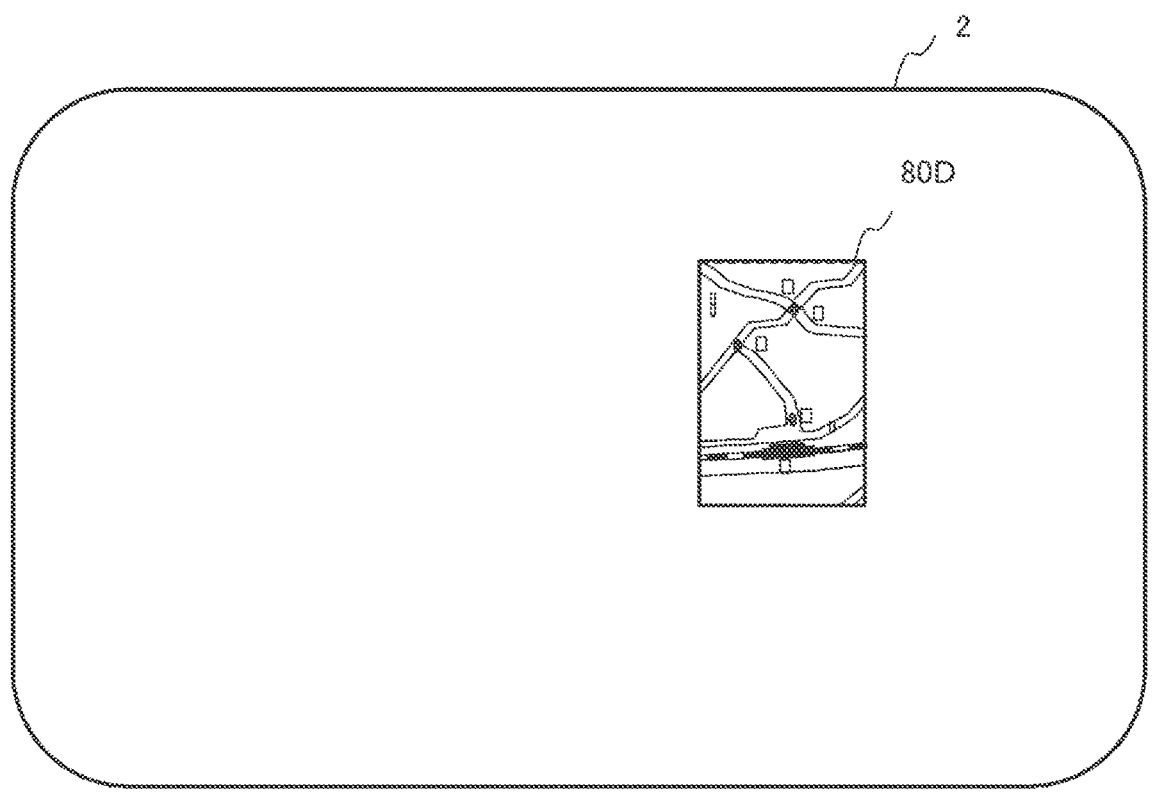
FIG. 11 illustrates a scene which is obtained through a display when the application screen is displayed.

With reference to FIGS. 6 to 11, an outline of processing of the HMD linking system 100 will be described. FIG. 6 illustrates a flowchart showing a flow of the processing of the HMD linking system 100. FIG. 7 illustrates a flowchart showing a flow of application screen display control processing according to the first embodiment. FIG. 8 illustrates a positional relationship between the field of view and the mobile information terminal 80 (application screen is not displayed). FIG. 9 illustrates a scene which is obtained through the display 2 when the application screen is not displayed. FIG. 10 illustrates a positional relationship between the field of view and the mobile information terminal 80 (application screen is displayed). FIG. 11 illustrates a scene which is obtained through the display 2 when the application screen is displayed. Hereinafter, the processing will be described in accordance with an order of steps illustrated in FIG. 6.

Both the mobile information terminal 80 and the HMD 10 are activated (step S01, step S02). Either of the HMD 10 and the mobile information terminal 80 may be activated first, or both the HMD 10 and the mobile information terminal 80 may be activated at the same time. In FIG. 6, the mobile information terminal 80 is activated first.

The mobile information terminal 80 makes a connection request to the HMD 10 (step S03) to establish a link (step S04).

After the link is established, the transfer corresponding application program 204d of the mobile information terminal 80, which is application program stored in the mobile information terminal 80, is activated (step S05). The transfer corresponding application program 204d transmits an application activation notification, which indicates that the transfer corresponding application program 204d has been activated, to the HMD 10 (step S06).

The HMD controller 5 receives the application activation notification, and then activates the screen transfer middleware 104b1 stored in the HMD 10 (step S07).

The screen transfer middleware 104b1 makes the outside camera 3 of the HMD 10 start capturing, and then the outside camera 3 starts outputting an image to the HMD controller 5 (step S08). Since the outside camera 3 includes the field of view of the user of the HMD 10 within its angle of view, an imaging area of the outside camera 3 herein is assumed to be the same as the field of view of the user M on the HMD 10.

The HMD controller 5 executes processing to display the application screen on the display 2 (application screen display control processing) (step S09). In the first embodiment, whether the mobile information terminal 80 is present in the image taken by the outside camera 3 is used as a start condition (trigger) for displaying the application screen.

As illustrated in FIG. 7, a screen transfer middleware 104b1 acquires an image taken by the outside camera 3 (step S091), and executes image recognition processing for recognizing whether a subject (object) in the image is the mobile information terminal 80 (step S092). There are several specific algorithms of the image recognition processing. For example, a front surface of the mobile information terminal 80 is imaged in advance by the outside camera 3, and a front image obtained by the imaging above is held as teacher data. Then, subject extraction processing is performed on the image taken by the outside camera 3, and pattern matching processing between the subject and the teacher data is executed. When the degree of matching is equal to or greater than a predetermined threshold value, the mobile information terminal 80 may be determined to be the subject. In a case of using the front image, the processing may be configured not to recognize that the subject is the mobile information terminal 80 when the mobile information terminal 80 in the image taken by the outside camera 3 is turned upside down, lied on its side, or partially shielded by being placed behind something.

When it is determined that the subject is the mobile information terminal 80 (step S093/Yes), in other words, when it is determined that the mobile information terminal 80 is in the field of view as illustrated in FIG. 8, the HMD controller 5 sets a value of a screen transfer flag to "0" (step S094), and does not display the application screen on the display 2. In the case above, as illustrated in FIG. 9, the user M can visually recognize the mobile information terminal 80 through the display 2 of the HMD. In this way, the user M does not visually recognize the application screen on the display 2 but directly watches the application screen displayed on the terminal display 281 through the display 2.

When it is determined that the subject is not the mobile information terminal 80 (step S093/No), in other words, when it is determined that the mobile information terminal 80 is not in the field of view as illustrated in FIG. 10, the HMD controller 5 sets the value of the screen transfer flag to "1" (step S095), and displays the application screen on the display 2. In the case above, as illustrated in FIG. 11, the user M visually recognizes the application screen displayed on the display 2.

While the application screen is displayed on the display 2 of the HMD 10, the application screen of the terminal display 281 of the mobile information terminal 80 may be hidden or continuously displayed. Processing in which the mobile information terminal 80 displays or hides the application screen, or performs transition from a display operation to a sleep operation (operation of hiding and darkening the screen) may be executed by a screen control function of the mobile information terminal 80, or the transfer corresponding application program 204*d* may have the screen control function.

When a termination condition of the application display screen control processing is satisfied (step S096/Yes), the screen transfer middleware 104*b*1 terminates the application screen control processing. When the termination condition of the application screen control processing is not satisfied (step S096/No), the screen transfer middleware 104*b*1 returns to step S091 and repeatedly acquires images from the outside camera 3. As a result, unless the termination condition is satisfied during link establishment, the user M wearing the HMD 10 and watching the mobile information terminal 80 visually recognizes the actual application screen of the mobile information terminal 80, while, when the user M removes the mobile information terminal 80 from the field of view, for example, lowers the hand holding the mobile information terminal 80 or puts the mobile information terminal 80 into a pocket or a bag, the application screen is displayed on the HMD 10.

When the termination condition of the application screen control processing is satisfied, the link between the HMD 10 and the mobile information terminal 80 may be released, or the link may be maintained while terminating only the screen transfer middleware 104*b*1. In such a case, when the activation notification of the transfer corresponding application program 204*d* is transmitted to the HMD 10 again, the transfer display of the application screen can be immediately started.

The termination condition may include, for example, detection of an operation of terminating the screen transfer middleware 104*b*1 or the transfer corresponding application program 204*d*, or detection of an operation of turning off a main power of the mobile information terminal 80 or the HMD 10.

In FIG. 6, an example in which the transfer corresponding application program 204*d* of the mobile information terminal 80 is a master while the screen transfer middleware 104*b*1 is a slave has been described. Meanwhile, the screen transfer middleware 104*b*1 may be a master and the transfer corresponding application program 204*d* may be a slave, and moreover, a communication control method in which both of them serve as a master may be employed. That is, after establishing a link by connection request which is transmitted from the screen transfer middleware 104*b*1 to the mobile information terminal 80, the activation notification of the transfer corresponding application program 204*d* may be sent from the mobile information terminal 80 to the HMD 10.

Second Embodiment

Figure 12:
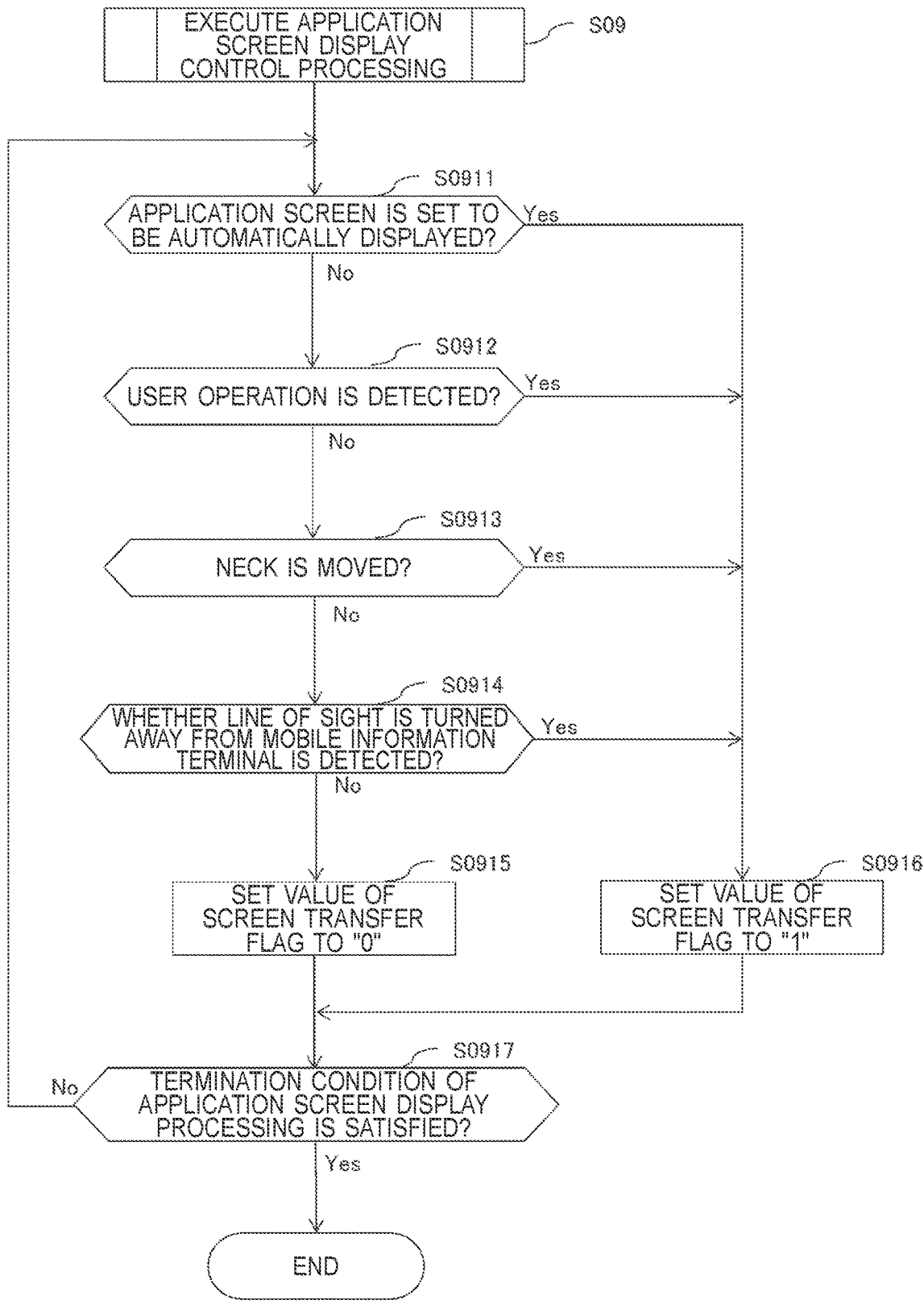
FIG. 12 illustrates a variation of an application screen display start condition according to a second embodiment.

A second embodiment differs from the first embodiment in the display start condition of the application screen. In the first embodiment, as the display start condition, a condition as to whether the mobile information terminal 80 is present in an image taken by the outside camera 3, in other words, whether the mobile information terminal 80 is included in the field of view of the user M is employed. Meanwhile, the display start condition is not limited to the one in the first embodiment. FIG. 12 illustrates a variation of the application screen display start condition according to the second embodiment.

The second embodiment uses the following conditions as the application screen display start condition.

Set Condition: Is the application screen set to be automatically displayed on the display 2 of the HMD 10 (step S0911)? In a case of being set to be automatically displayed, the application screen may be displayed on the display 2 when the application screen is not included in the field of view.

Operation Condition: Is it detected that a user operation such as an operation of a main body button provided on the HMD 10, an operation of a remote controller, gesture, or the like has been performed (step S0912)? The application screen may be displayed on the display 2 when the operation detection sensor detects the user operation.

Body Motion condition: Is motion of the neck (head) of the user detected by sensing motion of the HMD 10 based on outputs from the gyro sensor 162 and the acceleration sensor 164 of the HMD 10 and each image output from the outside camera 3 and the inside camera 4 to assume that the detected motion corresponds to the motion of the neck (head) of the user (step S0913)?. Here, the body motion condition is described as the display start condition for performing transition to a displayed state upon detection of the motion of the neck in a non-displayed state. On the other hand, in a case of detecting the motion of the neck in the displayed state of the application screen, there is a case where the user moves the neck to watch the mobile information terminal 80. In such a case, the motion condition may be used as a condition for performing transition from the displayed state to the non-displayed state. The HMD controller 5 is configured to perform transition of the application screen from the displayed state to the non-displayed state or from the non-displayed state to the displayed state on the display 2 when angular velocity included in the output from the gyro sensor 162 or acceleration included in the output from the acceleration sensor 164 is equal to or greater than a predetermined threshold value set to determine that the neck has been moved. In a case of using an image, for example, the HMD controller 5 is configured to perform transition of the application screen from the displayed state to the non-displayed state or from the non-displayed state to the displayed state on the display 2 by determining that a place which is watched by the user is changed, that is, the user moves the neck to see a different place when a difference amount between the images taken in preceding and following times is equal to or greater than a predetermined threshold value. In FIG. 12, it is assumed that the application screen is not displayed before detection of the body motion.

Line of Sight Condition: Is it detected that the line of sight has been turned away from the mobile information terminal 80 (step S0914)? The image recognition processing is executed with respect to the image taken by the outside camera 3 to detect on which area of the image the mobile information terminal 80 is displayed. Since the outside camera 3, the inside camera 4, and the display 2 are fixed to the wearing body 1, calibration is performed in advance with respect to the relationship between pixel position in each image included in the image taken by the outside camera 3 on the display 2 and a display position of the display 2, so as to generate and store outside camera positioning data.

The line of sight detection sensor 168 is configured to detect the eye of the user from the image taken by the inside camera 4 so as to detect motion of the line of sight by tracking change in a position of the eye. Since the relationship between pixel positions in the image taken by the inside camera 4 and a display position of the display 2 is also associated, inside camera positioning data in which they are associated to each other in advance is generated and stored.

Then, the image taken by the outside camera 3 (mobile information terminal 80 is imaged therein) and the image taken by the inside camera 4 (eye of the user is imaged therein) are compared with the outside camera positioning data and the inside camera positioning data, respectively, so as to detect that the line of sight of the user M is turned away from the mobile information terminal 80. It may be configured not to display the application screen when the mobile information terminal 80 is included in the field of view and when the line of sight is on the terminal display 2, while displaying the application screen on the display 2 when the mobile information terminal 80 is included in the field of view and when the line of sight is not on the terminal display 2. In the case above, the application screen may be displayed on the display 2 also when the mobile information terminal 80 is not included in the field of view.

When the screen transfer middleware 104*b*1 determines that any one of the set condition (step S0911), the operation condition (step S0912), the body motion condition (step S0913), and the line of sight condition (step S0914) is satisfied as illustrated in FIG. 12 (step S0911 to step S0914/ either of them is Yes), the value of the application screen display flag is set to 1 (step S0916), and the processing is terminated. On the other hand, when it is determined that neither of the display start conditions (step S0911 to step S0914) is satisfied (step S0911 to step S0914/all of them are No), the value of the application screen display flag is set to 0 (step S0915), and the processing proceeds to a step for determining satisfaction of the termination condition of the application screen display control processing (step S0917). The order in the determination of satisfaction as to each of the display start conditions is not limited to the order illustrated in FIG. 12. In addition, in FIG. 12, the processing proceeds to step S0916 when any one of the conditions is satisfied, meanwhile, it may be configured that the processing proceeds to step S0916 when at least one of the conditions is satisfied, in other words, when any one of or a plurality of combinations of the conditions is/are satisfied.

According to the present embodiment, display or non-display control of the application screen can performed by using the display start condition which is different from the presence or absence of the mobile information terminal 80 in the field of view described in the first embodiment. Accordingly, it is possible to provide an operation environment that matches a purpose of use, a situation of use, and preference of the user M by setting the conditions which is performed by the user M. In this connection, in the second embodiment, the presence or absence of the mobile information terminal 80 in the field of view may be included as one of the display start conditions.

Third Embodiment

The third embodiment is an embodiment of a variation relating to a display position of the application screen. As to which position of the display 2 of the HMD 10 should the application screen be displayed, various modes are conceivable. The following is a list thereof.

(1) Display on Set Position: The application screen may be displayed on a predetermined position such as the right end of the display 2. Furthermore, the HMD controller 5 may be configured to store a position where the application screen was displayed at the termination of preceding application screen display control processing (step S09), and when the application screen display control processing (step S09) is resumed, display the application screen on the position of the preceding termination.

(2) Display on Position Corresponding to Type of Application: On which position of the display 2 the application screen should be displayed may be predetermined in accordance with the type of the transfer corresponding application program 204*d*. For example, in the case of a map navigation application, the application screen may be displayed at the right end or the left end of the display 2 which is off the center of the line of sight in order to secure the field of view in front of the eye. On the other hand, in the case of an electronic book application, the application screen may be displayed on the center of the display 2 for easy reading. In this way, the display position may be changed in accordance with the function of the transfer corresponding application program 204*d*.

(3) Line of Sight Tracking: The line of sight detection sensor 168 may be configured to continue to detect the line of sight of the user M based on the image taken by the inside camera 4 so as to display the application screen on a position where the display 2 intersects the line of sight. For example, in a case where the transfer corresponding application program 204*d* is a map navigation application, when the user wearing the HMD 10 walks, a map is displayed on the line of sight. With this configuration, the road indicated by the navigation can be easily identified with the actual road, thereby allowing the user to easily understand the navigation information.

Figure 13:
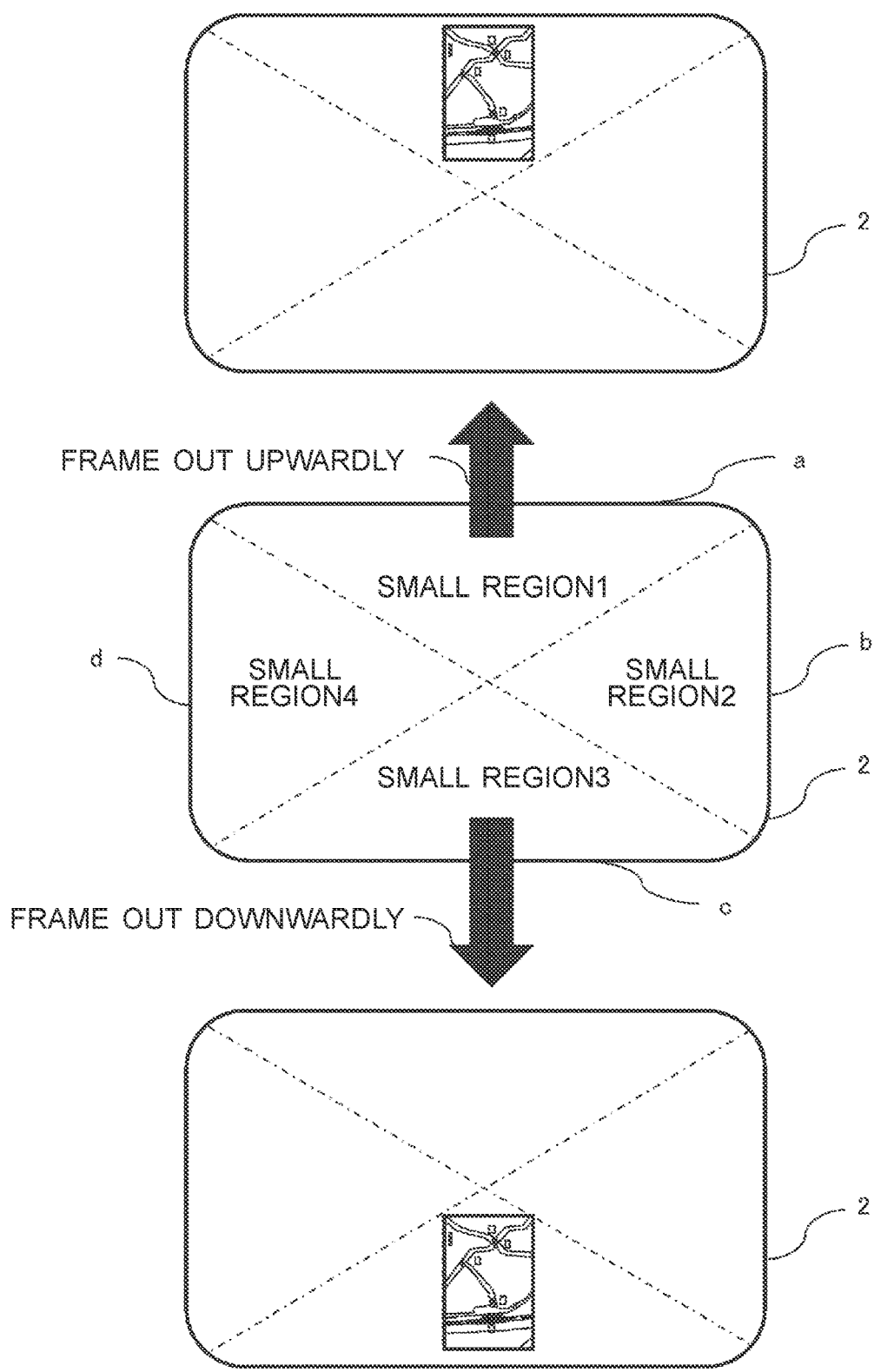
FIG. 13 illustrates a re-display position after framing out.

(4) Re-Display Position (after the mobile information terminal 80 inside the field of view of the HMD 10 moves out therefrom): FIG. 13 illustrates a re-display position after framing out. As illustrated in FIG. 13, in a case where the outside camera 3 generates a plurality of frames along a time series so as to image a motion image, each side forming an outer edge of each of the frames which constitute the motion image, each side a, b, c, d of the display 2, and small regions 1, 2, 3, 4 of the display 2 are associated with each other in advance. Each of the small regions 1, 2, 3, 4 is a region adjacent to each of the sides a, b, c, d. The screen transfer middleware 104b1 may be configured to acquire through which side (outer edge) of a second frame the mobile information terminal 80, which was imaged in the first frame, has framed out, and display the application screen in one of the small regions of the display 2 which has been associated with the acquired side. Here, the second frame is a frame which is imaged later than the first frame.

For example, as illustrated in FIG. 13, when the mobile information terminal 80 frames out from the upper side of the frame imaged by the outside camera 3, the user M sees that the mobile information terminal 80 frames out from the side a of the display 2, and accordingly, the application screen is displayed in the small region 1. When the mobile information terminal 80 frames out from the bottom side of the frame imaged by the outside camera 3, the user M sees that the mobile information terminal 80 frames out from the side c of the display 2, and accordingly, the application screen is displayed in the small region 3.

In this connection, the screen transfer middleware 104b1 may be configured to acquire a position on which the mobile information terminal 80 was displayed immediately before moving out from the display 2 so as to display the application screen thereon.

(5) Position Adjustment of Application Screen: The HMD 10 may be provided with a unit for adjusting a display position after transferring the application screen. For example, the unit may be configured to, when a swipe operation is performed on the terminal display 281 of the mobile information terminal 80, make the application screen of the display 2 of the HMD 10 link with the swipe operation so as to change the display position thereof on the display 2.

According to the present embodiment, since the display position of the application screen can be adjusted in accordance with a purpose of use and preference of the user, it is possible to provide the HMD linking system 100 with higher visibility.

Fourth Embodiment

Figure 14:
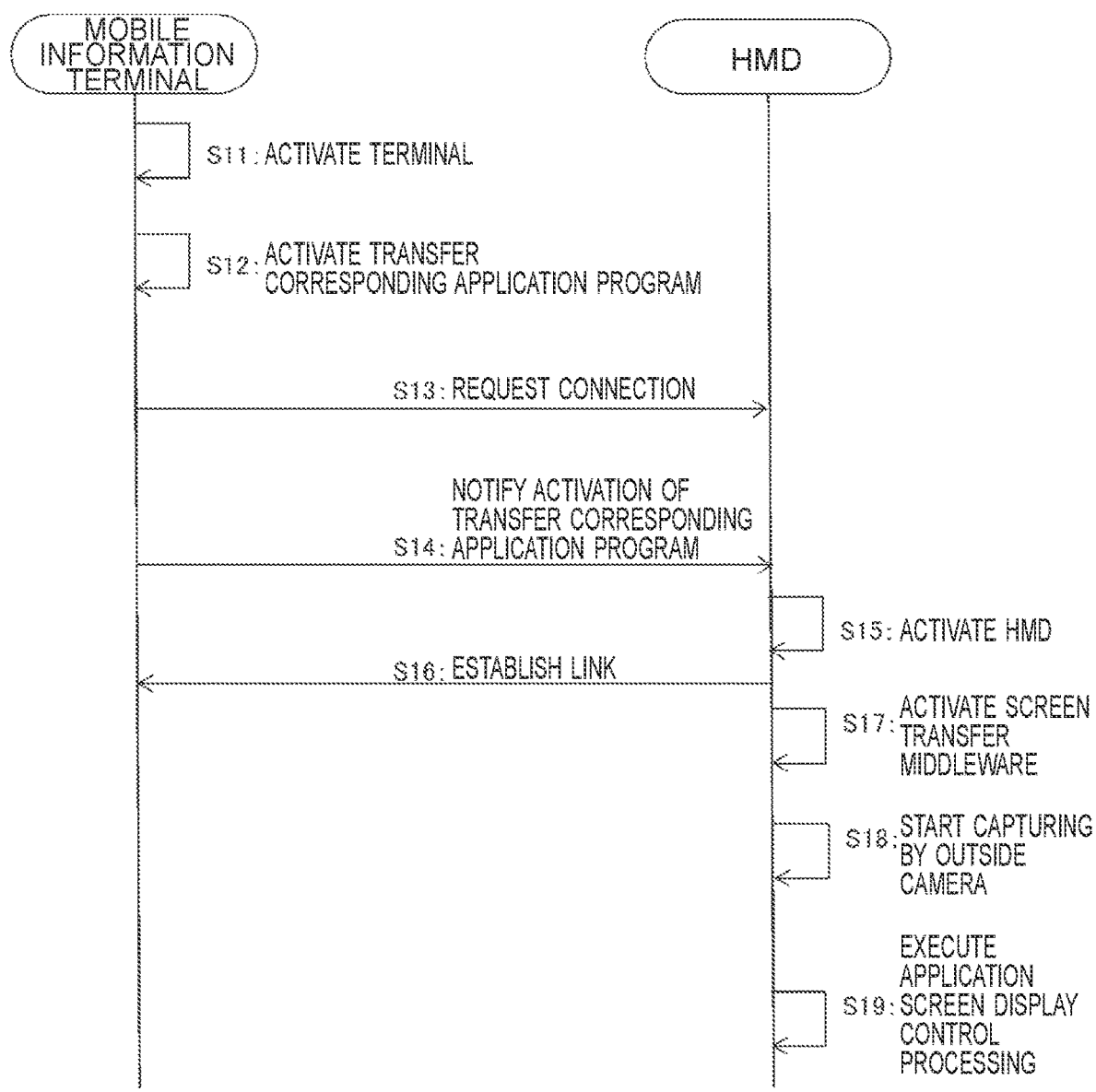
FIG. 14 illustrates an example of a sequence of an HMD linking system according to a fourth embodiment.
Figure 15:
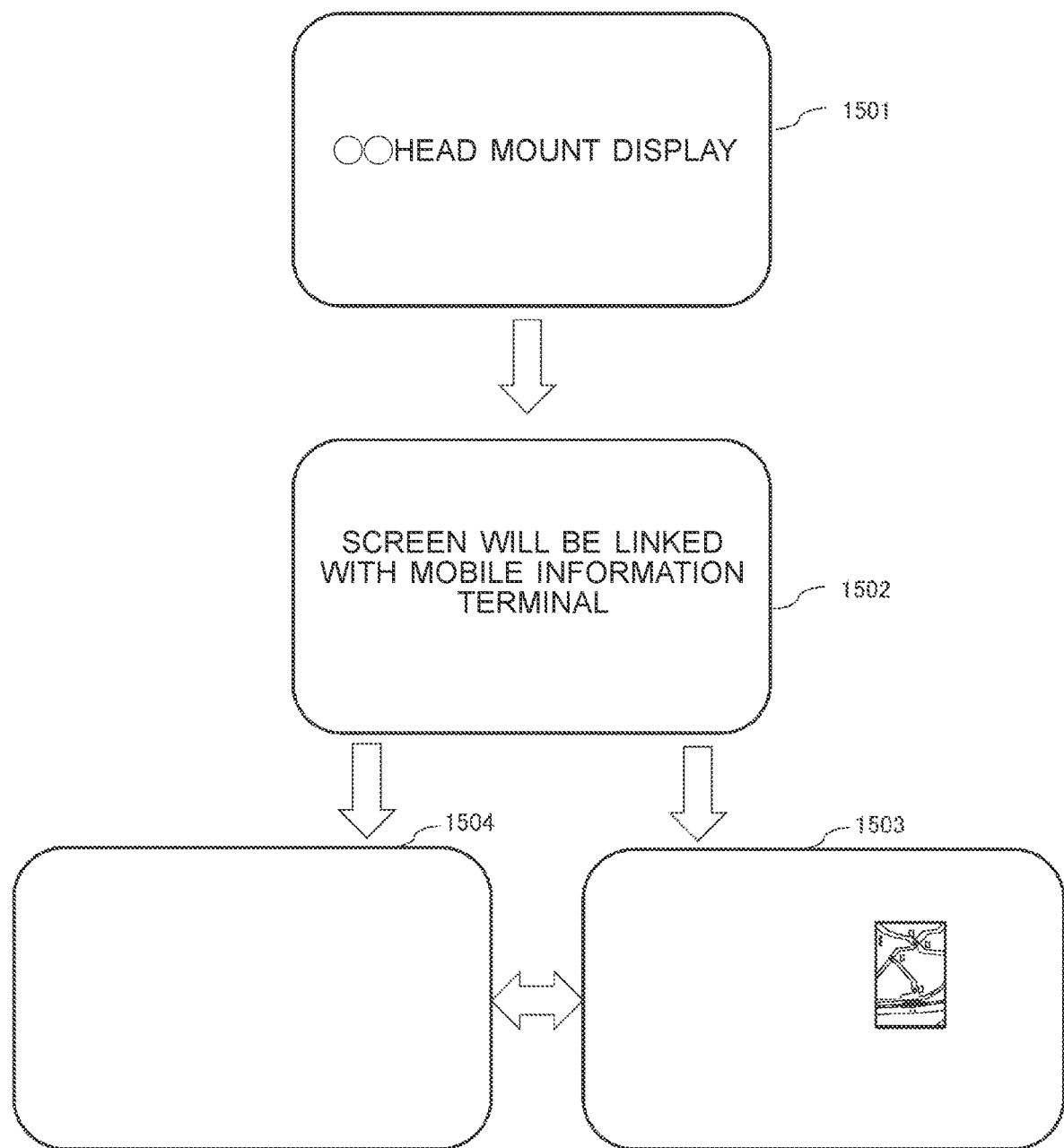
FIG. 15 illustrates screen transition of an HMD.

The fourth embodiment relates to display control of an HMD top screen when the HMD 10 is activated after the transfer corresponding application program 204d is activated. FIG. 14 illustrates an example of a sequence of the HMD linking system 100 according to the present embodiment. FIG. 15 illustrates screen transition of the HMD 10.

When the HMD 10 is normally activated, a top screen 1501 of the HMD 10 is displayed on the display 2, and then a screen relating to processing of the HMD 10 is displayed.

On the other hand, as illustrated in FIG. 14, in a case of activating the transfer corresponding application program 204d (step S12) after activating the mobile information terminal 80 (step S11) in the HMD linking system 100, when the HMD 10 is activated (step S15) after making connection request (step S13) and transmitting transfer corresponding application program start notification (step S14), transition may be performed from a linkage notification screen 1502 to an application screen displayed screen 1503 or a standby screen 1504 on which the application screen is not displayed, without displaying a top screen 1501.

That is, at the time of activating the HMD 10 (step S15), the top screen 1501 is displayed on the display 2 in the normal activation processing. On the other hand, when the HMD 10 is activated in response to the transfer corresponding application program activation notification, the linkage processing between the HMD 10 and the mobile information terminal 80 is performed thereafter.

Accordingly, after a link is established (step S16), the screen transfer middleware 104b1 is activated (step S17) without displaying the top screen 1501. The screen transfer middleware 104b1 may be configured to display the linkage notification screen 1502 in response to link establishment, start capturing by the outside camera 3 (step S18), and proceed to the application screen display control processing (step S19).

The present embodiment is for a case where the user M, who wants to perform screen linkage in the HMD 10 after starting use of the transfer corresponding application program 204d by operating the mobile information terminal 80, activates the HMD 10. In this case, the user M wants to display the application screen on the HMD 10 as quickly as possible. The present embodiment is configured to display the linkage notification screen 1502 without displaying the top screen 1501 as described above, and accordingly, the user M does not feel discomfort which may be caused by the top screen 1501 that the user M does not want to watch. As a result, it is possible to reduce irradiation during waiting for display of the application screen.

As processing for further reducing the irritation, the linkage notification screen 1502 may be skipped so as to display the application screen displayed screen 1503. However, in a case where the application screen display start condition is not satisfied, since the application screen displayed screen 1503 is not displayed, the user M cannot confirm whether linkage has been successfully performed. Accordingly, in the case above, the screen transfer middleware 104b1 may be configured to display the application screen displayed screen 1503 immediately after activating the HMD 10 when the application screen display start condition is satisfied, while displaying the linkage notification screen 1502 only when the application screen display start condition is not satisfied. In this case, the screen transfer middleware 104b1 may be configured not to display the linkage notification screen 1502 in step S17, but display the linkage notification screen 1502 when the application screen is determined not to be displayed on the display 2 in the application screen display control processing (step S19).

According to the present embodiment, the top screen of the HMD 10 is not displayed when it is not necessary in the HMD linking system 100, thereby reducing irritation of the user M and improving convenience.

Each of the embodiments described above is not intended to limit the scope of the present invention. Various modifications may be made without departing from the concept of the present invention, and these embodiments belong to the technical scope of the present invention. For example, the first to fourth embodiments may be arbitrarily combined.

REFERENCE SIGNS LIST

1: wearing body
2: display
3: outside camera
4: inside camera
5: HMD controller
10: HMD
80: mobile information terminal
100: HMD linking system

The invention claimed is:

1. A head-mounted display, comprising:
a wearing body to be worn on a head of a user;
a display provided on the wearing body in front of the user's eyes;
a communication module configured to perform communication connection with a mobile information terminal;
an outside camera provided on a front surface of the wearing body, which is configured to include a field of view of the user within an angle of view thereof;
an inside camera provided on an inside of the wearing body to face a head of the user; and
a controller connected to each of the display, the communication module, the outside camera and the inside camera,
wherein the controller is configured to:
perform image recognition processing of recognizing a subject included in an image taken by the outside camera and sight line detection processing of detecting a line of sight of the user based on an image taken by the inside camera;
control so as to display an application screen on the display when determining that the subject is not the mobile information terminal or when determining that the subject is the mobile information terminal but the mobile information terminal is not on the line of sight of the user, the application screen is a screen which indicates an execution state of application program executed by the mobile information terminal; and
control so as to not display the application screen on the display when determining that the subject is the mobile information terminal and the mobile information terminal is on the line of sight of the user.

2. The head-mounted display according to claim 1, further comprising
at least one of a gyro sensor and an acceleration sensor,
wherein the controller is further configured to perform transition of the application screen on the display from a displayed state to a non-displayed state, or the non-displayed state to the displayed state when at least one of angular velocity included in an output from the gyro sensor and acceleration included in an output from the acceleration sensor is equal to or greater than a predetermined threshold value.

3. The head-mounted display according to claim 1, further comprising:
an operation unit configured to accept an operation of the user,
wherein the controller is further configured to perform transition of the application screen on the display from a displayed state to a non-displayed state, or the non-displayed state to the displayed state when the operation is accepted by the operation unit.

4. The head-mounted display according to claim 1, wherein the inside camera is provided on the inside of the wearing body at a position and orientation on which movement of the eye of the user can be imaged.

5. The head-mounted display according to claim 1, wherein the controller is further configured to control so as to display the application screen on a predetermined position of the display.

6. The head-mounted display according to claim 1, wherein the controller is further configured to control so as to change a position where the application screen is displayed in accordance with a type of a function of the application program.

7. The head-mounted display according to claim 1, wherein the controller is further configured to control so as to display the application screen on the display even when the mobile information terminal is on the line of sight of the user if the application screen is set to be automatically displayed by the user.

8. The head-mounted display according to claim 1, wherein the display is a transmissive display and the application program is a map navigation application.

* * * * *